(12) United States Patent
Grubb et al.

(10) Patent No.: US 12,164,588 B2
(45) Date of Patent: Dec. 10, 2024

(54) ENHANCED NAVIGATION IN A WEB BROWSER WHILE AVOIDING REDIRECTS

(71) Applicant: International Business Machines Corporation, Armonk, NY (US)

(72) Inventors: Jordan Matthew Grubb, Eastleigh (GB); James Alexander Gordon, Doncaster (GB); Richard Pilot, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 16/517,718

(22) Filed: Jul. 22, 2019

(65) Prior Publication Data

US 2021/0026913 A1 Jan. 28, 2021

(51) Int. Cl.
| | |
|---|---|
| G06F 16/957 | (2019.01) |
| G06F 3/0484 | (2022.01) |
| G06F 16/9535 | (2019.01) |
| G06F 16/955 | (2019.01) |
| H04L 67/50 | (2022.01) |

(52) U.S. Cl.
CPC ........ *G06F 16/9574* (2019.01); *G06F 3/0484* (2013.01); *G06F 16/9535* (2019.01); *G06F 16/9558* (2019.01); *H04L 67/535* (2022.05)

(58) Field of Classification Search
None
See application file for complete search history.

(56) References Cited

U.S. PATENT DOCUMENTS

| | | | | |
|---|---|---|---|---|
| 5,832,212 A | * | 11/1998 | Cragun | G06F 16/9535 |
| | | | | 714/37 |
| 9,858,244 B1 | * | 1/2018 | Bjorkegren | G06Q 30/06 |
| 2004/0003346 A1 | * | 1/2004 | Blaschke | G06F 16/9574 |
| | | | | 707/E17.12 |
| 2007/0043745 A1 | * | 2/2007 | Rojer | G06F 16/9562 |
| 2008/0281817 A1 | * | 11/2008 | White | G06F 16/9535 |
| 2009/0292656 A1 | * | 11/2009 | Raman | G06N 5/025 |
| | | | | 706/11 |

(Continued)

FOREIGN PATENT DOCUMENTS

| | | |
|---|---|---|
| CN | 107480148 A | 12/2017 |
| WO | 2014118548 A1 | 8/2014 |

OTHER PUBLICATIONS

King et al, "How to Stop Web Pages From Redirecting", It Still Works, Jul. 17, 2019, 7:40 AM, Copyright 2019 Leaf Group Ltd. 3 pages, <https://itstillworks.com/stop-pages-redirecting-8787.html>.

(Continued)

*Primary Examiner* — Neveen Abel Jalil
*Assistant Examiner* — John J Morris
(74) *Attorney, Agent, or Firm* — Monchai Chuaychoo

(57) ABSTRACT

A plurality of web pages in a web browser are presented to a user. One or more web pages of the plurality of web pages are navigated in the web browser by following at least one hyperlink. A browser history of the user is stored as a chronological list or recently presented web pages. A determination is made whether a dwell time of the user on a first web page has exceeded a threshold time. In response to determining that the dwell time exceeded the threshold, an of-user-interest tag is added to the first web page stored to the browsing history.

20 Claims, 14 Drawing Sheets

(56) References Cited

U.S. PATENT DOCUMENTS

| | | | | |
|---|---|---|---|---|
| 2010/0115451 | A1* | 5/2010 | Moore | G06F 16/957 |
| | | | | 715/777 |
| 2017/0140049 | A1* | 5/2017 | Chefalas | H04L 67/10 |
| 2018/0025050 | A1* | 1/2018 | Yadav | G09B 7/00 |
| | | | | 707/766 |
| 2018/0332128 | A1 | 11/2018 | Gunther | |
| 2018/0341378 | A1* | 11/2018 | Morrow | G06F 3/0484 |
| 2019/0098096 | A1* | 3/2019 | Mocanu | H04L 67/148 |
| 2020/0142544 | A1* | 5/2020 | Fleck | G06F 16/9577 |

OTHER PUBLICATIONS

Mell et al., "The NIST Definition of Cloud Computing", Recommendations of the National Institute of Standards and Technology, NIST Special Publication 800-145, Sep. 2011, 7 pages.

"How many 301 Redirects can I do in a chain?", Redirect-Checker.org, Jul. 17, 2019, 7:33 AM, 2 Pages, <http://www.redirect-checker.org/how-many-redirects.php>.

"How to Block Page Redirects", 5 Ways to Block Page Redirects—wikiHow, Updated: May 15, 2019, 26 Pages, <https://www.wikihow.com/Block-Page-Redirects>.

\* cited by examiner

ENHANCED NAVIGATION IN A WEB BROWSER WHILE AVOIDING REDIRECTS

BACKGROUND

The present disclosure relates to a control feature for a web browser to assist navigating back to a previously viewed web page.

Web browsers are used to browse the Internet, or an organization's Intranet, on a computing device such as a personal computer, smartphone or tablet. For navigation, a standard web browser provides an address bar, a forward button, a back button, and a home button. The basic design of web browsers has remained largely unchanged for several years. A typical web browsing session begins at a search engine home page where the user enters a search term for a desired topic. Once the results are returned, the user navigates through the results, selects one of them, and then views a sequence of web pages following links embedded in the search results.

When running a web browser on an operating system for a personal computer, such as Microsoft Windows or Apple Mac OS, or an operating system for a smartphone, such as Android or Apple iOS, a user may arrive at a web page that redirects the browser several times, potentially opening new tabs in the process. Microsoft and Windows are trademarks of Microsoft Corporation of Redmond, Washington, United States of America. Apple, Mac and macOS are trademarks of Apple Inc., of Cupertino, California, United States of America. Android is a trademark of Google LLC of Mountain View, California, United States of America. iOS is a trademark of Cisco Systems, Inc. of San Jose, California, United States of America which is licensed to Apple Inc. for use as the name of Apple's operating system of the same name. If the user wishes to get back to the web page where the redirects started from this can be difficult, since the back button may not function as intended because of the redirects. Namely, when multiple tabs are open in the web browser, as is often the case with smartphones, pressing the back button may simply cause further redirects and the back button may merely result in walking the user through a maze of unwanted web pages without ever arriving back at the web page the user was previously viewing, and wants to view again. In the end, the user may solve the problem by closing all tabs in the browser and starting again by entering a term into a search engine.

If the web page the user wishes to return to is not stored in the user's favorites and the back button is not functioning as desired, the only other designed-in solution provided by a conventional web browser is for the user to call up the browser history and find the web page of interest, but this is quite inefficient, particularly on a smartphone, and especially so if there were many redirects in the meantime; it is quicker just to open a new tab and start again from the search engine home page.

SUMMARY OF THE INVENTION

Embodiments of the present invention include an approach for enhanced navigation in a web browser. In one embodiment, a plurality of web pages in a web browser are presented to a user. One or more web pages of the plurality of web pages are navigated in the web browser by following at least one hyperlink. A browser history of the user is stored as a chronological list or recently presented web pages. A determination is made whether a dwell time of the user on a first web page has exceeded a threshold time. In response to determining that the dwell time exceeded the threshold, an of-user-interest tag is added to the first web page stored to the browsing history.

According to one aspect of the disclosure, there is provided an add-on for a web browser which provides an additional control feature for users which is enabled through storing the browser history in a modified way in which web pages deemed to be of interest are tagged in the browser history list. The browser is of the kind which presents web pages to a user, navigates between web pages by following links, and stores browsing history as a chronological list of recently presented web pages. The add-on provides the web browser with a user interest tracker which adds a tag, such as by adding a boolean TRUE or by setting a flag, to selected web pages stored in the chronological list of recently presented web pages, wherein the tag is added to those web pages perceived to be of interest to the user as determined by a measure of web browser activity during presentation of that web page. The add-on provides the web browser with a back command that is user actuatable in the web browser. This back command has enhanced functionality compared to a conventional back command which simply moves back one web page at a time in the browser history list. Namely, actuation of the enhanced back command causes the web browser to select a web page from the list that is the most recent one with a tag (i.e., the most recent occurrence of a web page with an of-user-interest tag), thereby skipping past entries in the list that do not have such a tag.

The proposed add-on thereby tags redirected web pages so they can be skipped past by using the enhanced back command. The enhanced back command can be actuated by any convenient user input, such as in a graphical user interface with an additional "skip back" custom button, or through a long press-and-hold of the browser's conventional back button. The enhanced back command thus brings the web browser back to the web page the user was originally viewing before the redirects started. The proposed add-on provides a way of returning to a web page of interest after involuntary redirects have occurred that is more efficient than either of the conventional options of looking up the browser history, or returning to the search engine home page and starting a new search.

The web browser may be a mobile browser for a mobile computing device, such as a smartphone or tablet, or a browser designed for a conventional personal computer, for example.

The add-on can be made compatible with web browsers that support the existence of multiple browsing tabs by incorporating an extra feature in the user interest tracker. Multi-tab compatibility is provided in some embodiments by configuring the user interest tracker to add a tab-specific tag to selected web pages stored in the list, wherein the tab-specific tag is a pointer linked to the most-recently presented web page of a tab, the pointer being added to the list when the browser leaves a tab, so that if the back command is issued after jumping to a pre-existing tab it causes the web browser to select the web page from the list that is the most recent one with an of-user interest tag prior to the web page marked by the pointer pertaining to the pre-existing tab that has just been jumped to. Multi-tab compatibility is provided in other embodiments by configuring the user interest tracker to add a tab-specific tag to selected web pages stored in the list, wherein the tab-specific tag is an indicator of which tab the web page was presented from, and wherein the back command is operable such that upon actuation it causes the web browser to select the web page from the list that is the most recent one with an of-user-interest tag, wherein the selection is restricted to those web pages in the list that are known to have been previously presented in the same tab as the currently presented web page as marked by the tab-specific tag.

The add-on may be configured such that, if the back command is re-actuated within a threshold amount of time after the last actuation, the re-actuation causes the web browser to select a web page from the list that is the most recent one with an of-user-interest tag that was presented prior to the web page selected by the last actuation of the back command.

Optionally, actuation of the enhanced back command purges any entries from the list that do not have an of-user-interest tag that lie in the list between the web page presented before and the web page presented after actuation of the back command.

The add-on may further comprise an enhanced forward command analogous to the enhanced back command. The enhanced forward command may first become active after actuation of at least one back command has caused the same web page to be entered twice in the list, wherein actuation of the enhanced forward command causes the web browser to select a web page from the list that is the next one with an of-user-interest tag after the most recent previous presentation of the currently presented web page. Optionally, actuation of an enhanced forward command purges any entries from the list that do not have an of-user-interest tag that lie in the list between the web page presented before and the web page presented after actuation of the forward command.

There are various options that can be used for the above-mentioned measure of web browser activity. In some embodiments, the measure is based on the amount of time the web page was presented (i.e., viewed by the user). The web page can then be given an of-user-interest tag conditional on the amount of time being greater than a threshold value. The measure may also be based on receipt of user input to a user interface of the web browser during the time when the web page was presented. User input to the interface may be of any kind supported by the operating system. For example, user input to the user interface may be one or more of: touch input to a touchscreen interface; speech input to an audio interface; cursor motion in or a cursor-linked button input to a graphical user interface; or page scrolling in a graphical user interface. The measure may also be based on input from a camera that views the user. For example, the measure could be based on: face tracking of the user; blink counts of the user; and/or eye motion tracking of the user.

The features that have been described above as provided in a web browser add-on may be designed into the standard version of the web browser, so to not be an add-on, but rather an in-built feature of the web browser. The disclosure, therefore, also relates to a web browser operable to present web pages to a user, to navigate between web pages by following links, and to store browsing history as a chronological list of recently presented web pages, the web browser comprising: a user interest tracker operable to add a tag to selected web pages stored in the chronological list of recently presented web pages, wherein the tag is added to those web pages perceived to be of interest to the user as determined by a measure of web browser activity during presentation of that web page; and a back command that is user actuatable in the web browser and upon actuation causes the web browser to select a web page from the list that is the most recent one with an of-user-interest tag.

Since the web browser may be an integral part of the device's operating system, the disclosure also relates to an operating system comprising a web browser as described above, e.g., a web browser as installed in a mobile computing device as part of its operating system.

The disclosure further relates to a computing device loaded with the above-mentioned web browser. The disclosure further relates to a computer readable medium on which is stored the above-described add-on, web browser or operating system, so as to be loadable into internal memory of a computing device. The disclosure further relates to a computer program product storing the above-described add-on, web browser or operating system.

Another aspect of the disclosure is a method of supplying the above-described add-on to a web browser. The web browser is of the kind that is operable to present web pages to a user, to navigate between web pages by following links, and to store browsing history as a chronological list of recently presented web pages. The method comprises: providing a website from which the add-on may be downloaded to a third-party computing device on request; and causing the add-on to be sent via a network connection to the computing device in response to such a request together with an installer for integrating the add-on with a web browser installed on the computing device.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Before describing details of the web browser design according to embodiments of the disclosure, we describe first an example personal computing device able to host a web browser according to embodiments of the disclosure and also a mobile or tablet device able to host a web browser according to embodiments of the disclosure. A web browser has the function of presenting web pages to a user and allowing the user to navigate between web pages by following links embedded in the web pages. This activity is referred to as web browsing.

Figure 1:
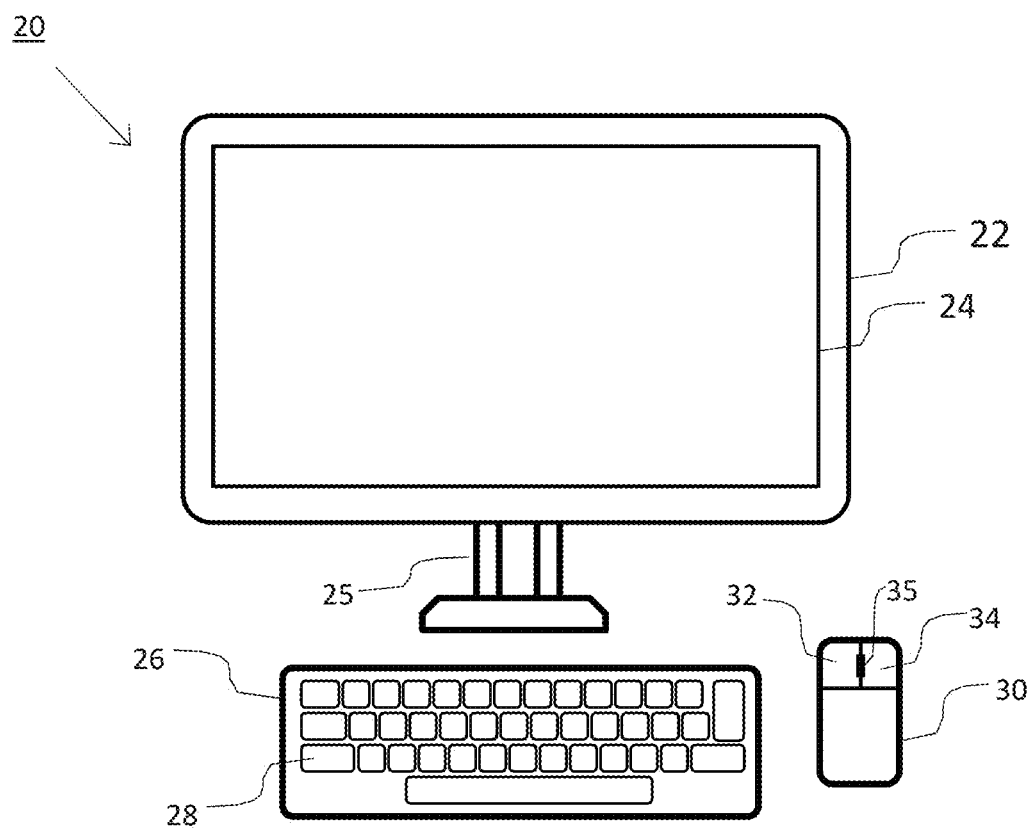
FIG. 1 shows a generic personal computing device on which a web browser of the disclosure may be installed and run, in accordance with an embodiment of the present invention.

FIG. 1 shows a generic computing device 20 on which a web browser according to embodiments of the disclosure may be installed and run. The computing device 20 comprises a monitor 22 housing a display 24 and having a stand 25. The computing device 20 further comprises suitable user input/output (I/O) devices with a keyboard 26 and mouse 30 being illustrated. In the case that the display 24 includes an overlaid touch sensor (not shown in FIG. 1), then the touch sensor will constitute a further I/O device. The keyboard 26 includes a plurality of keys 28, e.g. following a standard QWERTY layout and space bar, with other standard keys such as ENTER, CAPS LOCK, ALT, CTRL, FN and so forth also being provided. The mouse 30 is illustrated as including a left button 32, a right button 34 and a scroll wheel 35. Input from the mouse 30 is used to control the position of a cursor on the display 24 and thus forms part of the graphical user interface (GUI), so that cursor motion may be used to place the cursor over a button icon or other GUI control presented on the display, and then actuation of mouse button 32 or mouse button 34 when the cursor is positioned over such a button icon may be interpreted as pressing the button, thereby providing a cursor-linked button input to the GUI. Of course, further buttons and input elements may also be included, such as in a mouse designed or configured for gaming or other specific application types.

Figure 2:
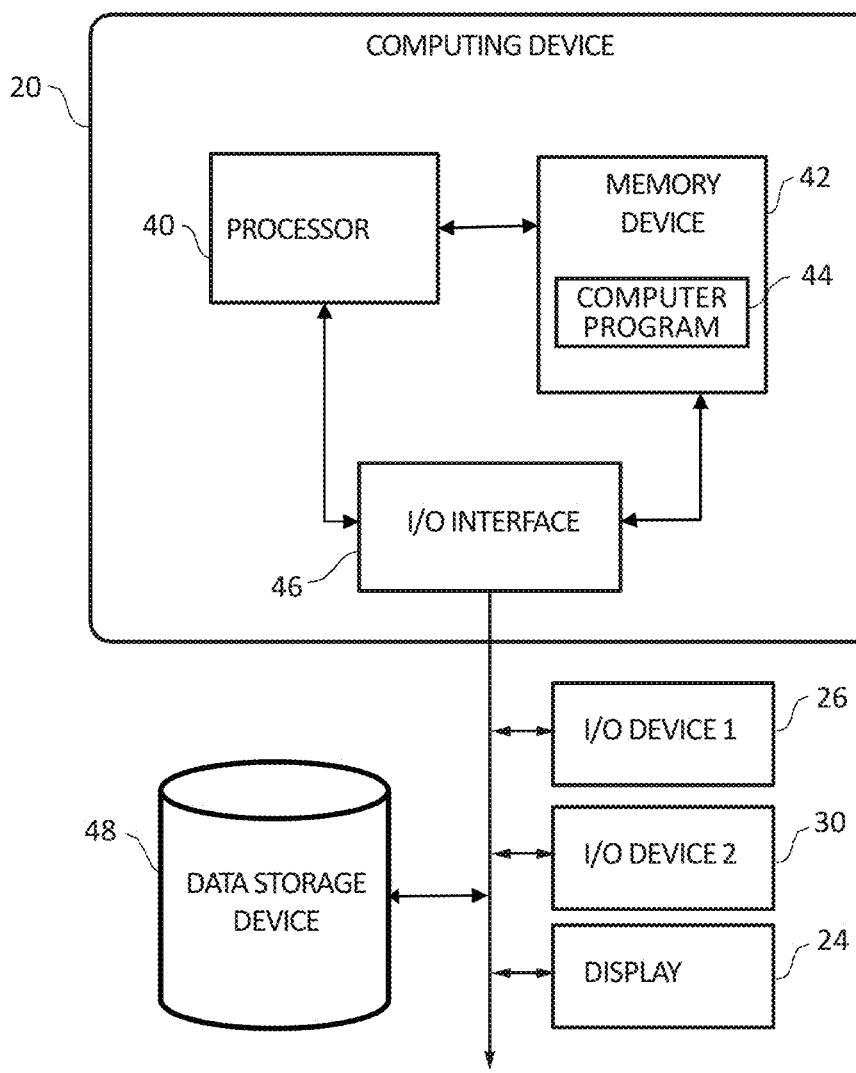
FIG. 2 shows an internal structure of the generic personal computing device of FIG. 1, in accordance with an embodiment of the present invention.

FIG. 2 shows the internal structure of generic computing device 20 of FIG. 1 in a block diagram. The computing device 20 comprises a processor 40 to provide a processor resource coupled through one or more I/O interfaces 46 to one or more hardware data storage devices 48 and one or more I/O devices (e.g., I/O device 1 26 and I/O device 2 30), which can manage graphic object requests, and the display 24 on which graphics objects can be displayed. The processor 40 may also be connected to one or more memory devices 42. At least one memory device 42 to provide a memory resource contains one or more stored computer programs 44, each computer program comprising a set of computer-executable instructions. An example computer program is a web browser. The data storage devices 48 may store the computer program 44. The computer program 44 stored in the storage devices 48 is configured to be executed by processor 40 via the memory devices 42. The processor 40 executes the stored computer program 44.

Figure 3A:
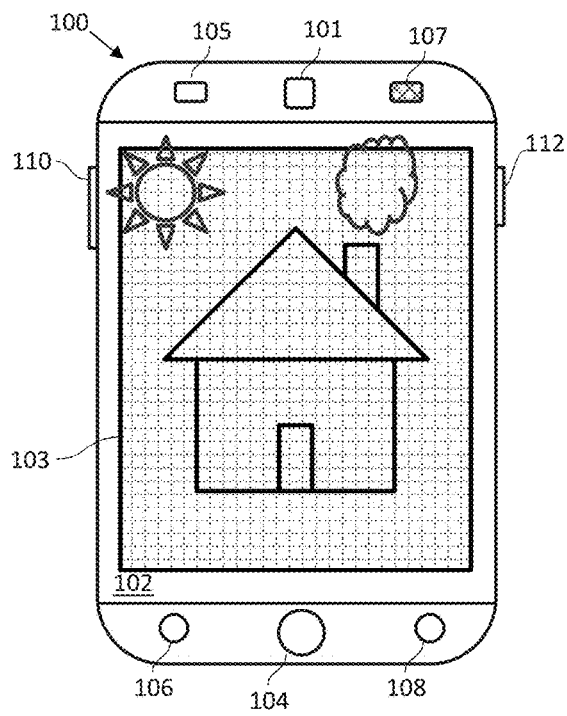
FIG. 3A is a schematic view of the front of a handheld touchscreen computing device, in accordance with an embodiment of the present invention.
Figure 3B:
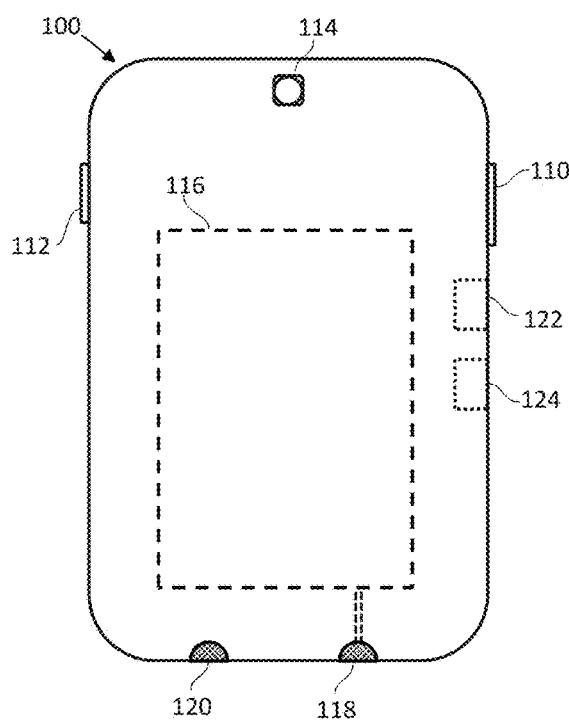
FIG. 3B is a schematic view of the rear of the handheld touchscreen computing device of FIG. 3A, in accordance with an embodiment of the present invention.

FIG. 3A and FIG. 3B are schematic perspective views from the front and back of a handheld touchscreen computing device, such as a mobile phone or tablet, on which a web browser, according to embodiments of the disclosure, may be installed and run.

Figure 4:
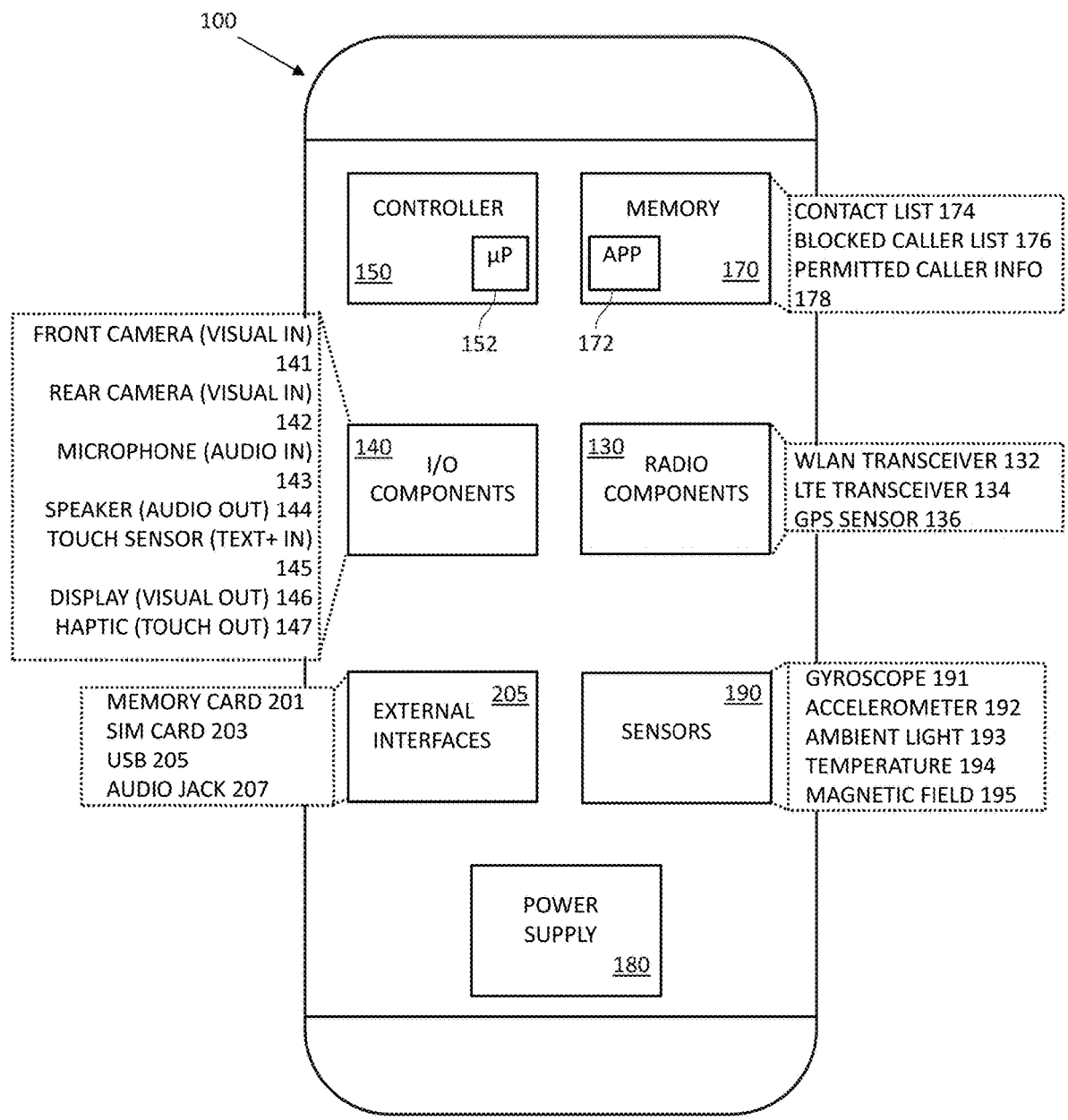
FIG. 4 is a block diagram of the functional components of the handheld touchscreen computing device of FIG. 3A and FIG. 3B, in accordance with an embodiment of the present invention.

FIG. 4 is a block diagram of the functional components of the computing device of FIG. 3A and FIG. 3B.

Referring to FIG. 3A, the computing device 100 has a smartphone or tablet format. The computing device 100 is arranged in a housing with a front face (facing outwards from FIG. 3A), a rear face, and a bezel forming the edges of a substantially rectilinear object. The front face is mostly taken up with a touch screen display which combines a display 102 (shown displaying a scene with house, smoke, and sun) with a touch sensitive area 103 (shown with the cross-hatching). The touchscreen enables the user to input commands to applications running on the computing device 100 through gestures, which vary from the single touch of a point on the display to select it, referred to in the art as a tap, and other single touch gestures, such as a swipe, through to multitouch gestures such as the two-finger pinch conventionally used for zooming in, zooming out, and rotating. We note that in this document references to gestures mean touch gestures on a touchscreen. The front face also accommodates a mechanical key (or button) 104 and two touch sensor keys (or buttons) 106 and 108, one located on either side of the mechanical key 104. The edges of the housing accommodate a mechanical rocker switch 110 for volume control and an on/off switch 112. There is also a haptic layer (not shown in FIG. 3A) embedded in the display 102 to provide tactile feedback.

A front facing camera 101 for capturing still or video images is arranged on the front face near the top of the housing facing forward and has adjacent to it a microphone 105 for capturing audio and a speaker 107 for outputting audio.

Referring to FIG. 3B, the back view of computing device 100, a rear facing camera 114 for capturing still or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device; there is also a second external connector in the form of an audio jack 120 for audio output. Further external interfaces may be provided including various ports, holders and sockets for physical connections. With dotted lines, two internal holders 122 and 124 are shown which may be for a subscriber identity module (SIM) card and a memory card or a further SIM card. The memory card is a data storage device.

Referring to FIG. 4, this shows selected functional components of the computing device 100. The computing device 100 has radio components 130, input/output (I/O) components 140, a controller 150 associated with a processor (uP) 152 and a memory 170, a power supply 180, sensor components 190, and external interfaces 205. The memory 170 is operable to store computer programs, typically referred to as computer applications ('apps' for short) 172. Each computer program comprises software code portions that are loadable into and executable by the processor 152. An example computer program is a web browser.

The memory 170 has various memory portions. There is a memory portion for storing a contact list 174 which is a data structure storing the user's known contacts which may be accessible and editable via a database app. There is a memory portion for storing a blocked caller list 176, which is a data structure storing telephone numbers or other caller identifiers which the user has logged as blocked callers, which may be accessible and editable via an app. There is also a further memory portion, permitted caller info 178, in which the user can store descriptions, descriptors, or characteristics of calls or types of call which the user wishes to permit, i.e., not block, even if they are not known contacts, these descriptions being accessible and editable via a database app.

The processor 152 may comprise separate processing units for specialist tasks such as video processing, speech/audio analysis, and/or speech/audio synthesis, e.g., with the aid of natural language processing (NLP). The controller and associated processor have the task of controlling the computing device and executing computer programs stored in the memory. The memory may store computer applications for running on the computing device as well as collecting data from the various I/O devices. The controller typically functions to control overall operation of the computing device, in addition to the operations associated with the application programs. The controller processes signals, data, information, and the like input or output through the above-mentioned components and/or runs application programs saved in the memory, thereby processing or providing a user with appropriate information and/or functions. The mobile device 100 is further operable to use its processor 152 to apply filtering to decide whether or not to generate a call alert responsive to detecting an incoming call.

The radio components 130 includes a WLAN transceiver 132, an LTE transceiver 134, and a GPS sensor 136. The I/O components 140 include a display (display (visual out) 146) capable of displaying content and also acting as part of a GUI, wherein the display may be based on a suitable technology such as liquid crystal or organic light emitting diodes, as well as a position-sensitive touch sensor area (touch sensor (text in) 145) overlaid on, or formed as an integral part of, the display to serve as part of a GUI in conjunction with the display with optionally other touch sensor areas or buttons (e.g. on the reverse side or edge (bezel) of the device housing). Further I/O components, as previously described, are front camera (visual in) 141 and rear camera (visual in) 142 for capturing still or video images, a microphone (audio in) 143 for capturing audio such as speech, a speaker (audio out) 144 for outputting audio, and a haptic output (haptic (touch out) 147) embedded in the touch screen to provide tactile feedback. The sensor components include a gyroscope 191, an accelerometer 192, an ambient light sensor (ambient light 193), a temperature sensor (temperature 194), and a magnetic field sensor (magnetic field 195), for example. The external interfaces (not shown in FIG. 4) may include various ports and sockets for physical connections, such as a SIM card, wired local area network (LAN) connectors, memory cards, audio jack socket, universal serial bus (USB) ports, and so forth.

The mobile device 100 is operable to use one of its I/O components 140 as an input device, e.g. for audio or text, to allow a user to input a description of a permitted caller. The mobile device 100 is further operable to use one or more of its I/O components 140 as an output device to generate a call alert, e.g. an audio output for sounding a ring tone, or a haptic output to cause the mobile device, or a part thereof, to vibrate.

Figure 5:
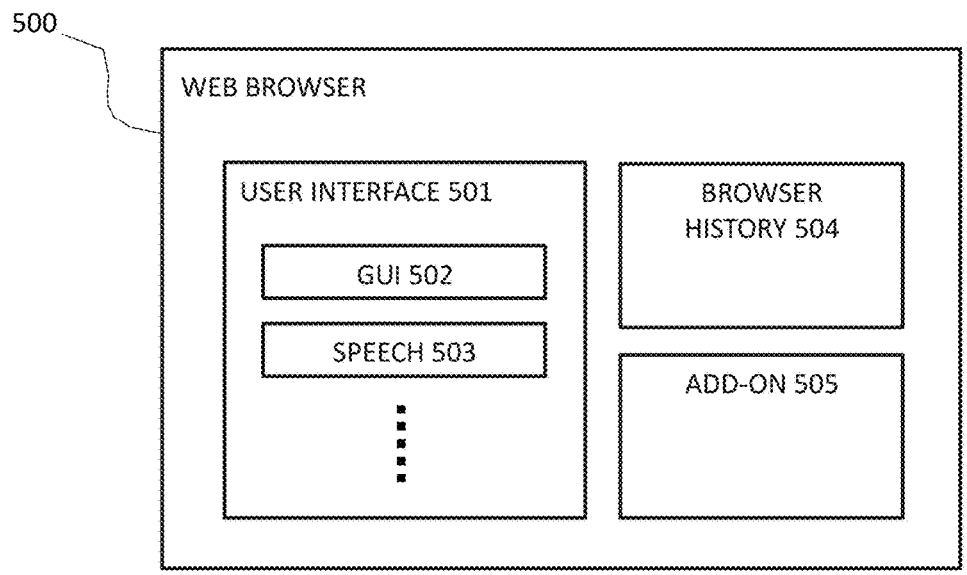
FIG. 5 shows components of a generic web browser including add-ons, in accordance with an embodiment of the present invention.

FIG. 5 shows components of a generic web browser 500. The web browser includes, or has access to input from and output to, a user interface 501 which in turn may have distinct elements. The user interface may comprise a GUI 502 (typically via a touch screen in a mobile device or a mouse or touchpad and display in a personal computer). The user interface may comprise a speech recognition user interface (speech 503), sometimes referred to as a virtual assistant (e.g. Apple Siri, Samsung Bixby, Microsoft Cortana, or Google Assistant, trademarks owned by Apple, Samsung, Microsoft, and Google, respectively). Other user interfaces and user interface elements may be provided. The web browser stores a user's recent browser history 504 as a chronological list of the web pages that have been presented. The browsing history of a web browser is usually accessible to a user via a "history" tab. The web browser optionally has one or more add-ons 505. Historically, browser add-ons 505 were provided as plug-ins, but more recently, browser add-ons 505 are provided as extensions. Typically, a plug-in is an executable, whereas an extension is source code. Browser add-ons 505 are software modules for customizing the web browser. Web browsers typically allow a variety of extensions, including user interface modifications, ad blocking, and cookie management. Web browsers are released with an application programming interface (API) to allow developers to write add-ons 505 for the web browser.

Figure 6:
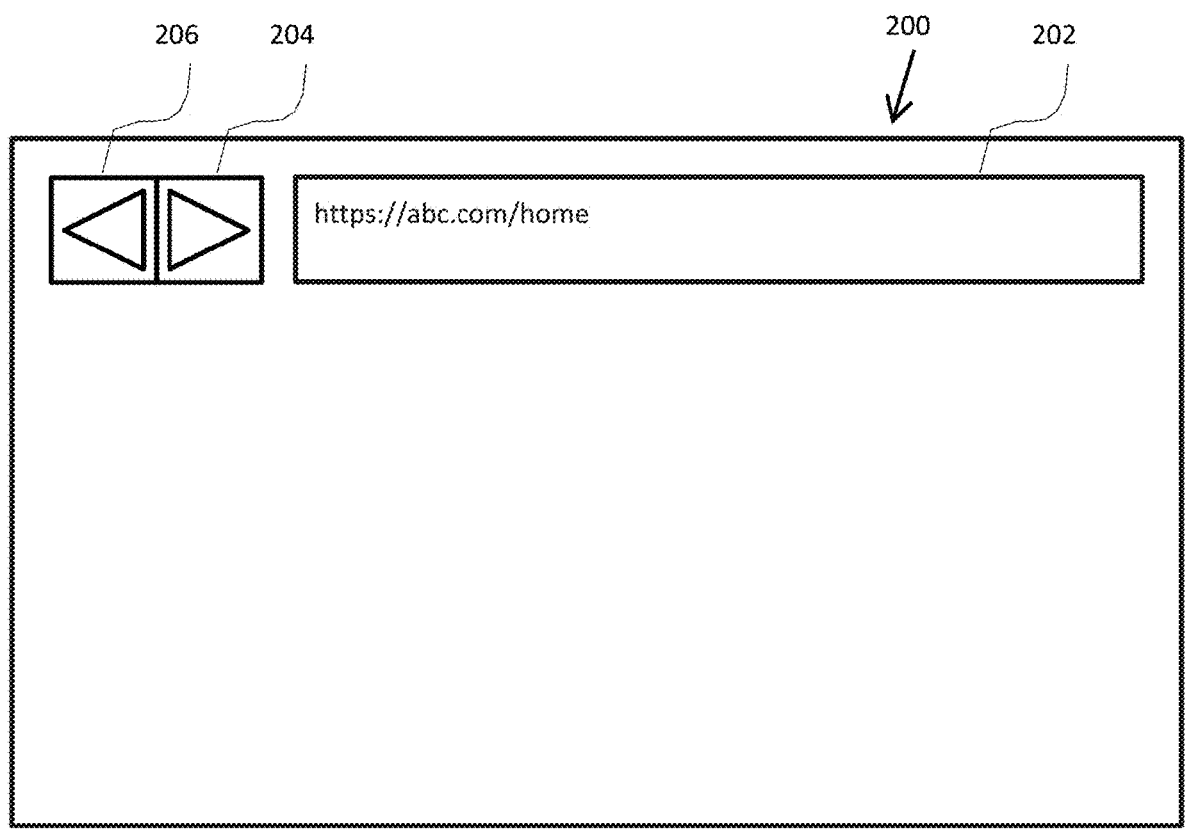
FIG. 6 shows features of a graphical user interface of a generic web browser, in accordance with an embodiment of the present invention.

FIG. 6 shows a GUI 200 of a generic web browser. The web browser GUI 200 includes an address bar 202, a forward icon 204 and a back icon 206 that are used as GUI control buttons to assist a user's navigation between web pages when browsing with reference to the browsing history. The browsing history of the web browser is a record of the web pages that have previously been presented by the web browser. Actuation of the back icon 206 is associated with a back command that is used to move backwards through the browsing history of the web browser to present the most recent previously presented web page. The forward icon 204 is associated with a forward command that is used to advance forward in a browsing history of the web browser, and first becomes active after a user has jumped backwards in the browsing history through actuation of the back command. The address bar 202 allows a user to enter in text a web address, e.g. unique resource locator (URL), of a desired web page.

Embodiments of the present disclosure provide a web browser add-on to a standard web browser which provides an enhanced back command and also optionally an analogous enhanced forward command as now described.

Figure 7:
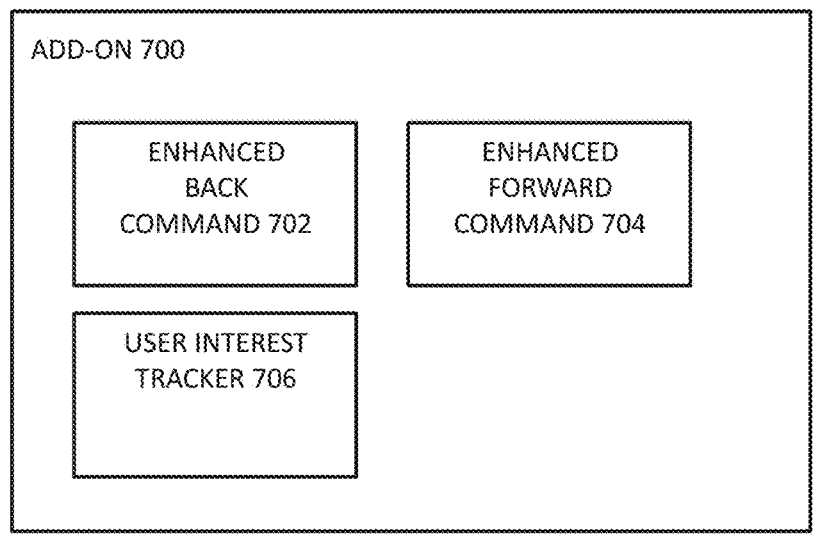
FIG. 7 shows components of an add-on according to embodiments of the disclosure, in accordance with an embodiment of the present invention.

FIG. 7 shows components of an add-on 700 according to embodiments of the disclosure, namely an enhanced back command 702, an enhanced forward command 704, and also a user interest tracker 706, whose function it is to tag web page entries in the history that are deemed of interest to the user, where deemed interest is a property determined by the user interest tracker according to data from when each web page was presented by the browser.

Figure 8:
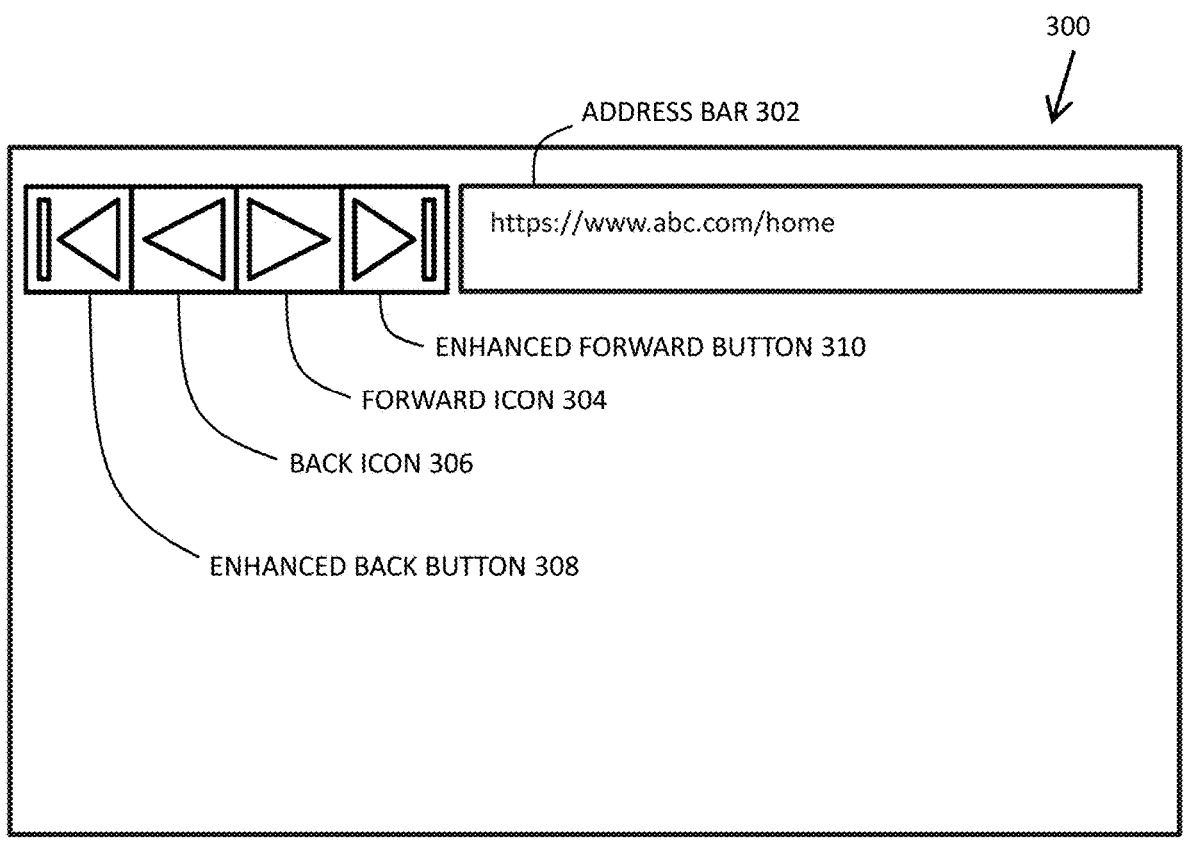
FIG. 8 shows a graphical user interface of a web browser with the add-on of FIG. 7, in accordance with an embodiment of the present invention.

FIG. 8 shows features of a GUI 300 of a web browser with the add-on 700 of FIG. 7. The web browser GUI 300 includes an address bar 302, a forward icon 304, and a back icon 306, which are from the standard browser and not associated with the add-on 700. The add-on 700 has the effect on the GUI 300 of adding an enhanced back button 308, for actuating the enhanced back command 702, and optionally an enhanced forward button 310, for actuating the optional enhanced forward command 704.

The user interest tracker 706 is operable to add a tag to selected web pages stored in the chronological list of recently presented web pages, i.e., the browser history. A tag is added to an entry in the list for those web pages perceived to be of interest to the user as determined by a measure of web browser activity during presentation of that web page in the browser session. These tags are referred to as of-user-interest tags. The enhanced back command 702 is actuatable in the web browser by the enhanced back button 308. Upon its actuation, a web page is selected by the web browser from the list that is the most recent web page with an of-user-interest tag. The enhanced back button 308 is provided alongside the conventional back icon 306. Actuation of back icon 306 causes the web browser to select the previously presented web page as discussed above with reference to FIG. 6. It can be seen from the example GUI of FIG. 8 that the add-on 700 has modified the standard GUI of the web browser shown in FIG. 6 to display the enhanced back button 308 adjacent to the back icon 306. As illustrated, icons analogous to the skip back ("|<") and the rewind ("<") icons on a media player can be used. An additional optional feature for the actuation of enhanced back button 308 can allow the user to move back in the history through multiple of-user-interest tagged web pages. Namely, if the enhanced back command 702 is re-actuated within a threshold amount of time after its last actuation, the re-actuation causes the web browser to select a web page from the list of web pages that is the most recent one with an of-user-interest tag that was presented prior to the web page selected by the last actuation of the enhanced back command 702.

In other embodiments, the GUI of the web browser may be unchanged by the add-on 700, with actuation of the enhanced back command 702 being caused by a long hold, e.g. over two seconds, on the back icon 306 for the conventional back command. A further option is that the proposed enhanced back command 702 is provided as a substitute to the web browsers conventional built in back command, so that the web browser's GUI is not changed, and actuation of the usual back button results in the enhanced back command 702 being performed, the conventional back command thus being removed from the GUI. Further, the add-on 700 could provide for two or more of these options with the web browser's user settings allowing the desired option to be selected.

Optionally, the add-on 700 may include an enhanced forward command 704 via enhanced forward button 310 analogous to the enhanced back command 702. The enhanced forward command 704 is user actuatable and first becomes active after actuation of at least one conventional back commend or enhanced back command 702 has caused the same web page to be entered twice in the browser history list. Actuation of the forward command may take place via user actuation of the enhanced forward button 310, and causes the web browser to select a web page from the list of web pages that is the next one with an of-user-interest tag after the most recent previous presentation of the currently presented web page. The above comments on the enhanced back command 702 and how it may be integrated in the web browser's GUI apply similarly to the enhanced forward command 704. For example, in analogy to a media player, the enhanced forward button 310 may be presented alongside the forward icon 304 so as a pair their icons mimic the forward (">") and skip-forward, or fast forward, (">|") buttons of a media player as illustrated in FIG. 8.

As mentioned above, whether the of-user-interest tag is added is decided based on a measure of web browser activity when that web page was being presented (i.e., viewed by a user).

A simple and effective measure is the amount of time the web page was presented. When a user dwells on a web page for an amount of time which is long enough for the user to visual perceive the content, then that web page can be deemed to have been of interest. Therefore, the web page can be given an of-user-interest tag conditional on the amount of time being greater than a suitable threshold value, e.g. one or two seconds. The threshold value may be varied by the browser depending on a past understanding of the viewing habits of the user and the nature of the website or web page being visited (i.e., the threshold is variable based on the content of the website or web page being viewed). For example, a text-rich website or web page may require a longer amount of time based on an expectation that the web page should only be deemed of interest when the user has had sufficient time to read a fraction of the text, whereas a website consisting of many individual photos that a user may flick through rapidly may require a shorter amount of time to qualify as being deemed of interest to the user.

Another useful measure may be based on receipt of user input to a user interface of the web browser during the time when the web page was presented (i.e., viewed by the user). Examples of user inputs that may be deemed to indicate user interest are: touch input to a touchscreen interface; speech input to an audio interface; cursor motion in or a cursor-linked button input to a GUI; and page scrolling in a GUI.

A further useful measure may be based on input from a camera that views the user, such as face tracking of the user, eye motion tracking, or blink counts of the user. In the case of face tracking, the measure may require presence of a face, and may in addition include facial expression analysis (i.e., analysis of facial movements of the user). In the case of eye motion tracking, the measure may require the eye to have been moved over a portion of the presented web page, or may require the eye to have followed a text-reading raster pattern. In the case of blink counts, the measure may require a threshold number of blinks to have occurred while the web page was being presented, where the threshold may be one, or may be a higher integer, such as two, three, or four.

Any of these factors on which the measure may be based can be combined in any desired permutation. For example, adding the of-user-interest tag may be conditional on the web page being presented for over a threshold amount of time in combination with (i.e., a logical AND with) at least one other of the above-mentioned factors, e.g. some kind of input having been received by the user interface during the period of presentation of the web page in question.

Figure 9:
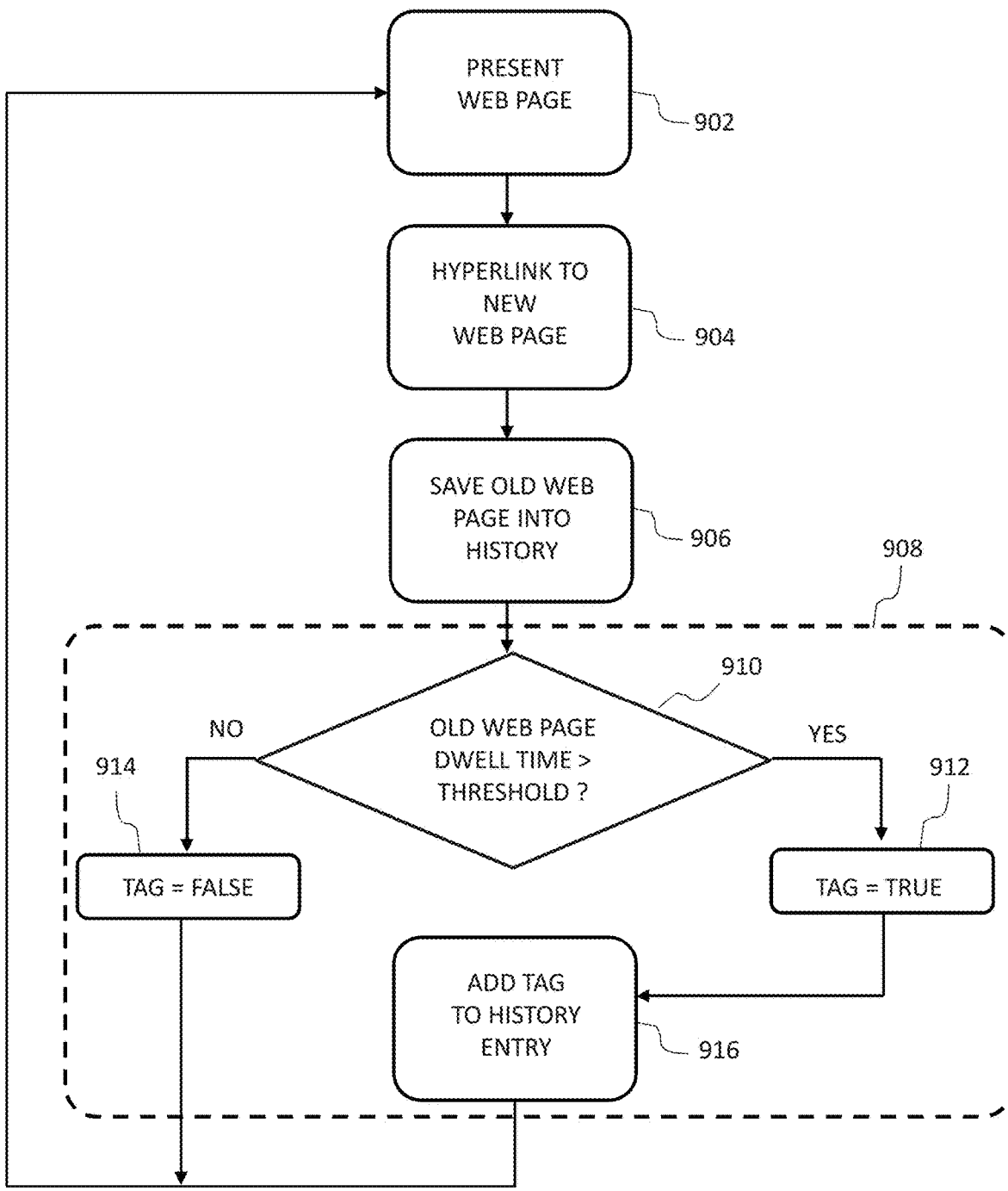
FIG. 9 is a flow diagram showing the workflow of an implementation of the user interest tracker to add of-user-interest tags to the browser history entries, in accordance with an embodiment of the present invention.

FIG. 9 is a flow diagram showing the workflow of an implementation of the user interest tracker 706 of add-on 700 to add of-user-interest tags to the browser history entries.

In step 902, the web browser presents a first web page.

In step 904, the web browser follows a link and presents a second web page.

In step 906, the web browser saves the first web page to the browser history.

In step 908, the add-on 700 functionality of the user-interest tracker is applied. This functionality adds a boolean TRUE/FALSE of-user-interest tag to the entry of the first web page in the browser history.

In step 910, a test is made of whether the first web page was of interest to the user as determined by a measure of web browser activity during presentation of that web page. In the illustrated example, this measure is the amount of time spent on the web page, and the test of this measure is whether it exceeds a threshold amount of time. Namely, with a YES outcome (step 910, YES branch), i.e., if the first web page was visited for longer than the threshold amount of time, or by some other test is determined by logic in the user interest tracker to have been of interest to the user, the of-user-interest tag is set to boolean TRUE in step 912, whereas with a NO outcome (step 910, NO branch), i.e., the first web page was visited for less than the threshold amount of time, or by some other test, it is seen as a redirected web page and the of-user-interest tag is set to boolean FALSE in step 914. The TRUE/FALSE tag is then stored as part of the browser history with its respective web page in step 916.

The browser history has now been updated and normal browser operation continues with a return to step 902.

The add-on 700 functionality of step 908 is useful in situations after the user opens a web page of genuine interest and has then been redirected without any user input. The tracker will have logged in the browser history with the of-user-interest tag that one or more FALSE boolean tags have been recorded in succession, indicative of a corresponding number of redirects. When the user triggers the enhanced back command 702, e.g. by pressing a new custom button (e.g., enhanced back button 308) that the add-on 700 has created in the GUI, or by hold-pressing the conventional back button (e.g., back icon 306), the user is taken back in the list to the last web page with a boolean TRUE of-user-interest tag. The enhanced back command 702 therefore bypasses, or jumps over, any redirected web pages in the browser history. This solution is effective, since, as what usually happens is the user is redirected extremely quickly through multiple web pages and then left on a web page where the user cannot back out with the conventional back command before being redirected again.

Figure 10:
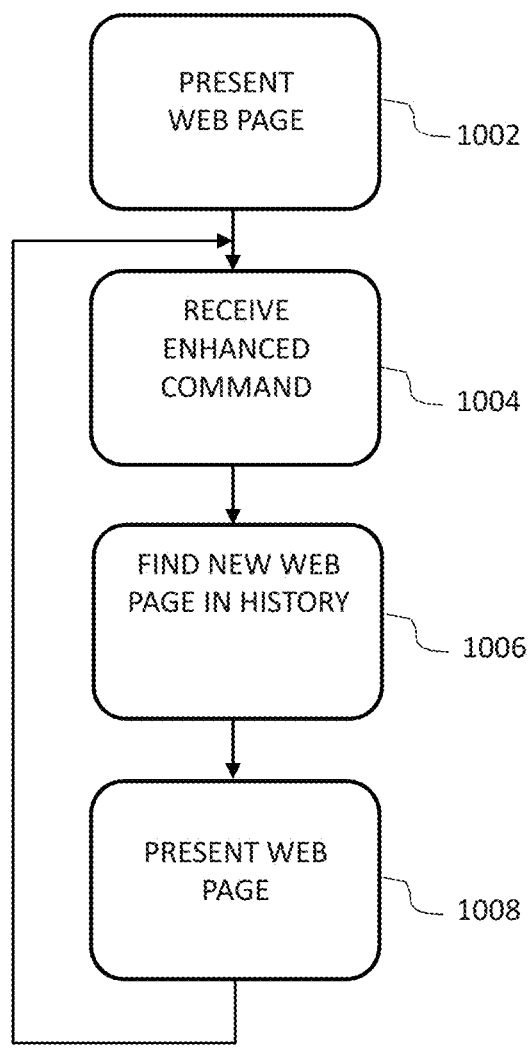
FIG. 10 is a flow diagram showing the workflow of an implementation of the enhanced back (or forward) command, in accordance with an embodiment of the present invention.

FIG. 10 is a flow diagram showing the workflow of an implementation of the enhanced back command 702 for skipping redirected pages when the user wishes to step back through recently visited web pages.

The starting situation (step 1002) is that of a web browser presenting a web page, i.e., step 902 from FIG. 9.

If the user actuates an enhanced back command 702 (or an enhanced forward command 704) as indicated in step 1004, then in step 1006 the web browser looks up the browser history and selects a web page from the list of web pages that is the most recent one with an of-user-interest tag (or in the case of an enhanced forward command 704, the web page from the list of web pages that is the next one with an of-user-interest tag after the most recent previous presentation of the currently presented web page).

The selected web page is then presented in step 1008 (which brings the process flow to the same position as step 902).

Figure 11:
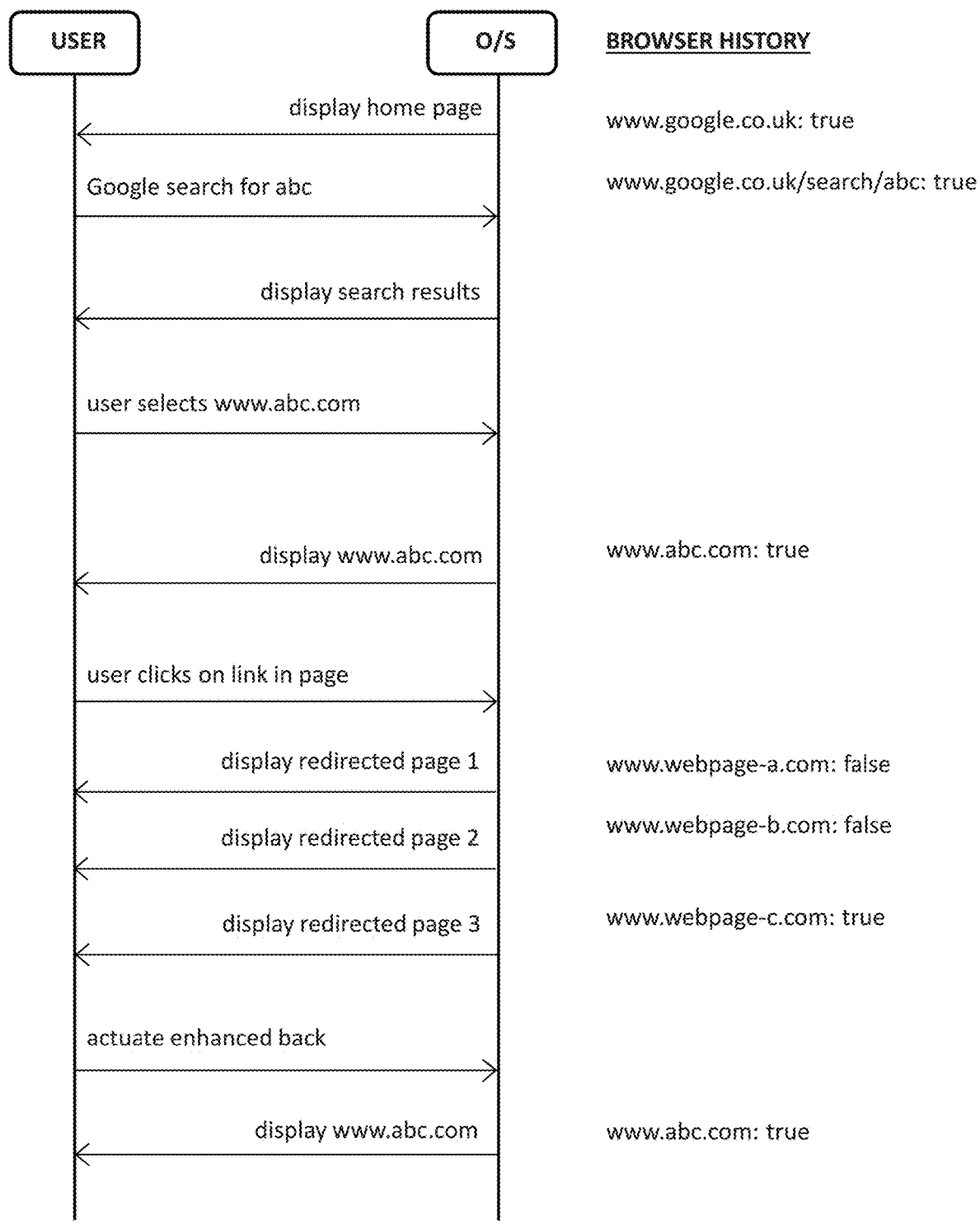
FIG. 11 shows an example browsing session with a web-browser having the add-on of FIG. 8 to FIG. 10, in accordance with an embodiment of the present invention.

FIG. 11 shows an example user browsing session in terms of the interaction between a user (labeled USER) and a web browser (labeled O/S for operating system) having the above-described add-on 700 and the associated entries as added chronologically to the browser history. The browsing session starts with the user being presented a search engine home page (e.g. "www.search.co.uk") and entering a search term "abc". Since the time on this web page is over the threshold, the browser history entry stores a boolean TRUE against this visit to "www. search.co.uk". A web page "www.search.co.uk/search/abc" with the search results is presented. The browser history stores a boolean TRUE against this entry also. The user selects the web page "www.abc.com" which is then presented. The browser history stores a boolean TRUE against this entry also. The user clicks on a link on this web page, which triggers a cascade of redirects to pages "www.webpage-a.com", "www.webpage-b.com" and "www.webpage-c.com". Since, the first two redirected pages "www.webpage-a.com" and "www.webpage-b.com" are only presented for a very short amount of time, they are both stored in the browser history with a boolean FALSE. The final redirect page of the cascade "www.webpage-c.com" is presented for a longer amount of time and so is stored with a boolean TRUE. The user has time to view the content of the page "www.webpage-c.com" and decides it is not of interest, so the user reacts by actuating the enhanced back command 702, e.g. by a press-hold of the GUI's back button (i.e., back icon 306). The enhanced back command 702 then causes the web browser to refer to the history and select and reload the web page "www.abc.com", since this is the last web page in the history before the currently presented page that has a TRUE tag. The user is thus returned to the web page where he or she hit the link that triggered the redirect cascade.

The web browser is thus provided with an enhanced back command 702 which skips past web pages that have been presented below a threshold amount of time (or by some other measure) and so are deemed not to be of interest to the user. To provide this feature, the conventional browser history is adapted by adding a boolean TRUE/FALSE tag to each browser history entry depending on how long the web page was presented (i.e., viewed by a user). Actuation of the enhanced back command 702 causes the web browser to select a web page from the browser history list that is the most recent one with a TRUE tag, thus skipping past FALSE tagged entries. Since bad redirects tend to cascade, all but the last one are presented for a short period of time and therefore, all but the last one will be given FALSE tags. Consequently, if the user actuates the enhanced back command 702 from the last redirected web page, the browser will go back to the web page from where the redirect was triggered.

An optional feature of the enhanced back command 702 is that any web pages in the history that are skipped over in the course of executing the enhanced back command 702, since they have boolean FALSE tags, can be purged, i.e., deleted, from the history. A corresponding feature may also be provided for the enhanced forward command 704.

Significantly the add-on 700 can be designed to work well with web browsers that support the existence of multiple browsing tabs, in particular mobile browsers. The add-on 700 can be implemented to be tab independent, which is important in such web browsers, since with some redirects the browser is redirected and then redirected again onto a new tab with more redirects. With a mobile browser this can happen unknowingly, i.e., without any user input.

To account for multiple tabs, the user interest tracker also adds a tab-specific tag to selected web pages stored in the browsing list. The tab-specific tag is an indicator of which tab the web page was presented from. The enhanced back command 702 operates such that, upon its actuation, it causes the web browser to select the web page from the list of web pages that is the most recent web page with an of-user-interest tag, with the proviso that the selection is restricted to those web pages in the list that are known to have been previously presented in the same tab as the currently presented web page as marked by the tab-specific tag. An efficient way of implementing this feature is by making the tab-specific tag a pointer that is linked to the most-recently presented web page of a tab. A pointer for a tab is added to the list of presented web pages when the browser leaves that tab. During subsequent browsing, if the user returns from one tab to an existing tab, and then actuates the enhanced back command 702, then the enhanced back command 702 causes the web browser to select the web page from the list that is the most recent web page with an of-user interest tag prior to the web page marked by the pointer as pertaining to the tab that has just been returned to.

Without an extra tab-specific tag as described, such as the above-mentioned tab pointer, the enhanced back command 702 would not be fully effective in all situations. In particular, without the extra tab-specific tag, if the user was in a first tab and redirects occurred, then the user changed to a second tab, then the user went back to the first tab (which would then present a redirected web page) and the user actuated the enhanced back command 702, the web browser would jump back to the second tab, since it would load the most recent web page with an of-user-interest tag, rather than staying in the first tab and finding the most recent web page with an of-user-interest tag in the first tab.

Figure 12:
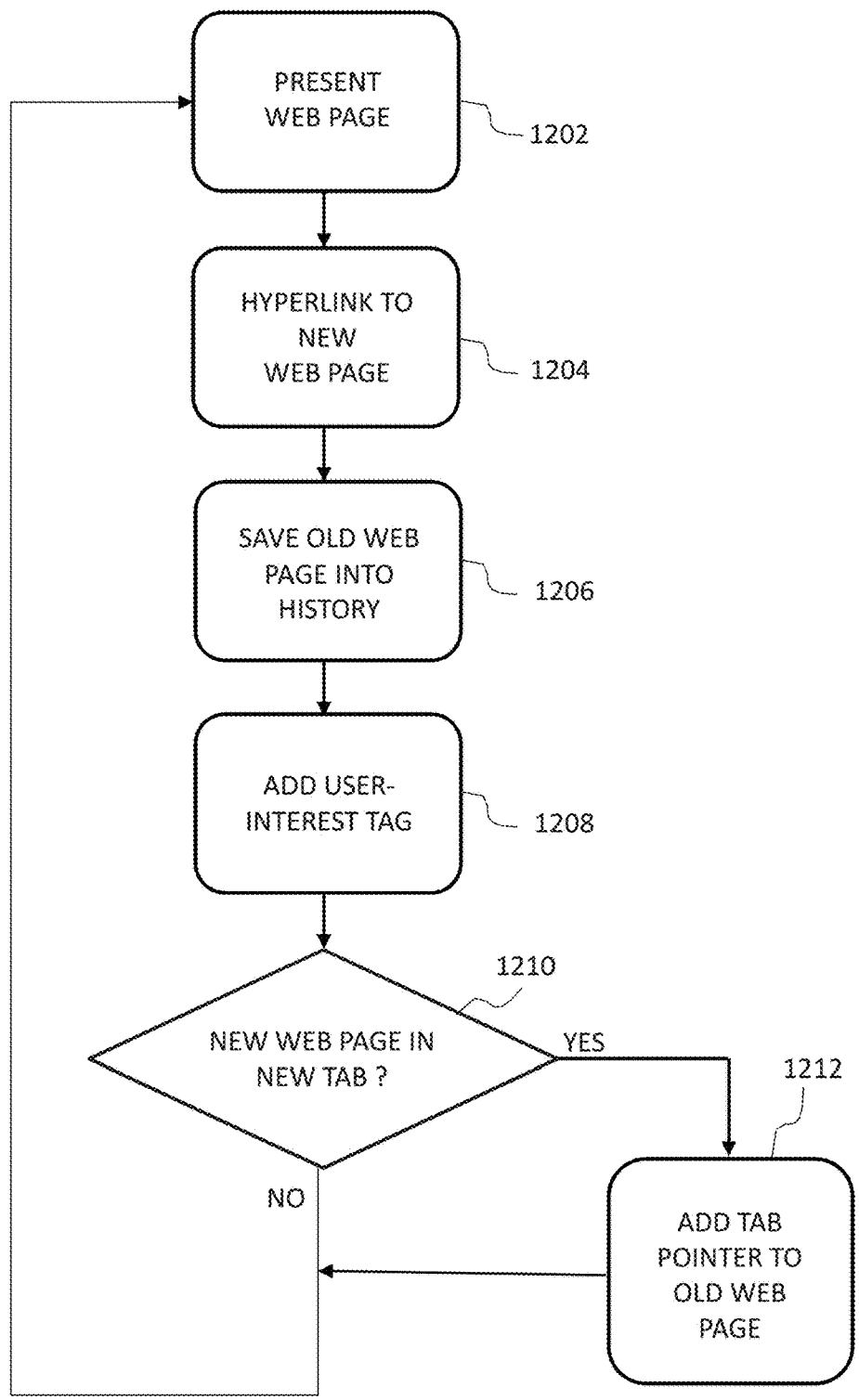
FIG. 12 is a flow diagram showing the workflow of updating browser history in an implementation of the add-on with an extra feature that caters for switching between browser tabs, in accordance with an embodiment of the present invention.

FIG. 12 is a flow diagram showing the workflow of updating browser history in an implementation of the enhanced back command 702 or enhanced forward command 704 with the extra feature whereby tab-specific tags, such as pointers, are added to the browser history. The steps 1202 to 1208 correspond to the steps 902 to 908 in FIG. 9. Steps 1210 and 1212 add the tab pointer. In Step 1210, the test is made of whether the new web page is in a new tab, i.e., a tab different from the tab of the old web page. If YES, then in step 1212 a tab pointer for the old tab is added to the browser history entry of the old web page. If NO, then no action is taken. The process flow then returns to step 1202. The actuation of the enhanced back command 702 or enhanced forward command 704 then follows the same flow as shown in FIG. 10, but in step 1006, the logical test used for selection of the new page is modified with reference to the tab pointer as described above.

FIGS. 13A to 13D show how the browser history is updated during an example browser session in the case that the add-on 700 has both of-user-interest tags and tab pointers.

Figure 13A:
FIG. 13A to FIG. 13D show how the browser history is updated using the add-on of FIG. 12 during an example browser session, in accordance with an embodiment of the present invention.

FIG. 13A shows the history in an initial tab, TAB 1, where the user starts at the web browser home page which is the default search engine home page "www.search.co.uk" and then makes a search, selects a result from the search, and is thus shown the home page of "www.xyz.com". The user then selects a link on that home page which results in redirection in quick succession through four unwanted web pages.

Figure 13B:

FIG. 13B shows that the user reacts to the outcome of the redirects by ignoring them and opening a new tab, TAB 2, in order that the default search engine home page is presented again. The tab change causes the web browser to drop a pointer for TAB 1, i.e., the tab that has just been exited, onto the last web page presented in TAB 1, i.e., "www.webpage-b.com". The user then searches for and selects the home page "www.123.com". After some time, the user then wants to go back to "www.xzy.com" which he knows was opened in TAB 1.

Figure 13C:
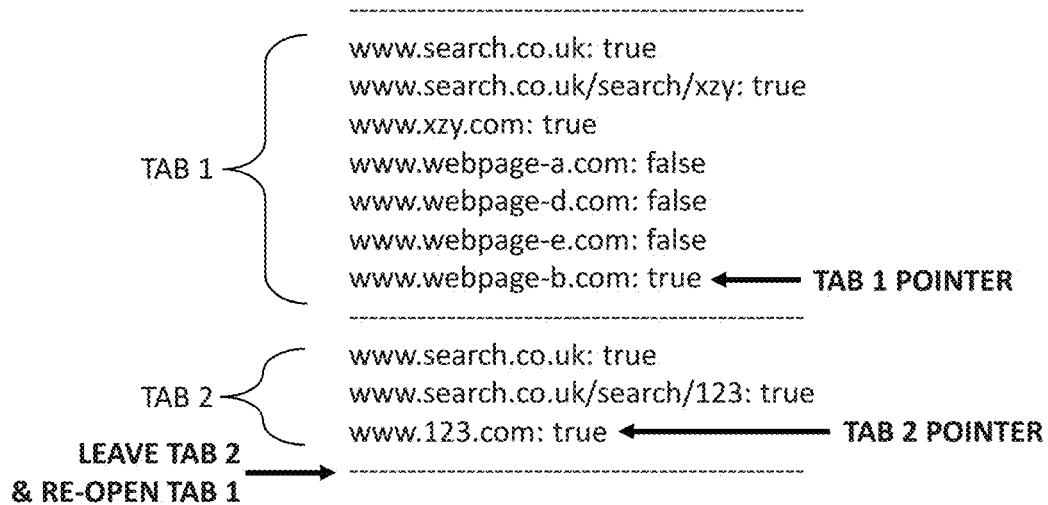

FIG. 13C shows the tab change back to TAB 1. The act of leaving TAB 2 causes the web browser to drop a pointer for TAB 2 onto the last web page presented in TAB 2, i.e., "www.123.com". The web browser then presents the last web page to have been presented in TAB 1 which is the web page "www.webpage-b.com".

Figure 13D:

FIG. 13D shows the subsequent events. To re-visit the desired page "www.123.com", the user actuates the enhanced back command 702, which causes the web browser to search the history back from the pointer for the current tab, i.e., the TAB 1 pointer, to the closest previous entry with a boolean TRUE, which is "www.xzy.com". The enhanced back command 702 also moves the pointer for the current tab, i.e., the TAB 1 pointer here, to follow the back-tracking through the history, so that in this example the TAB 1 pointer is moved from "www.webpage-b.com" to "www.xzy.com". In other words, the tab pointer feature results in the search back being initiated from the most recently presented web page in the current tab, i.e., TAB 1, thus excluding web pages from TAB 2. This page is then loaded and displayed in the web browser, as desired by the user. An optional feature of the enhanced back command 702 is that any web pages in the history that are skipped over in the course of executing the enhanced back command 702, since they have boolean FALSE tags, can be purged, i.e., deleted, from the history, as schematically illustrated in FIG. 13D by the three crossed-through web page entries for "www.webpage-e.com", "www.webpage-d.com", and "www.webpage-a.com".

It will be clear to one of ordinary skill in the art that all or part of the logical process steps of the preferred embodiment may be alternatively embodied in a logic apparatus, or a plurality of logic apparatuses, comprising logic elements arranged to perform the logical process steps of the method and that such logic elements may comprise hardware components, firmware components, or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying a computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device, to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
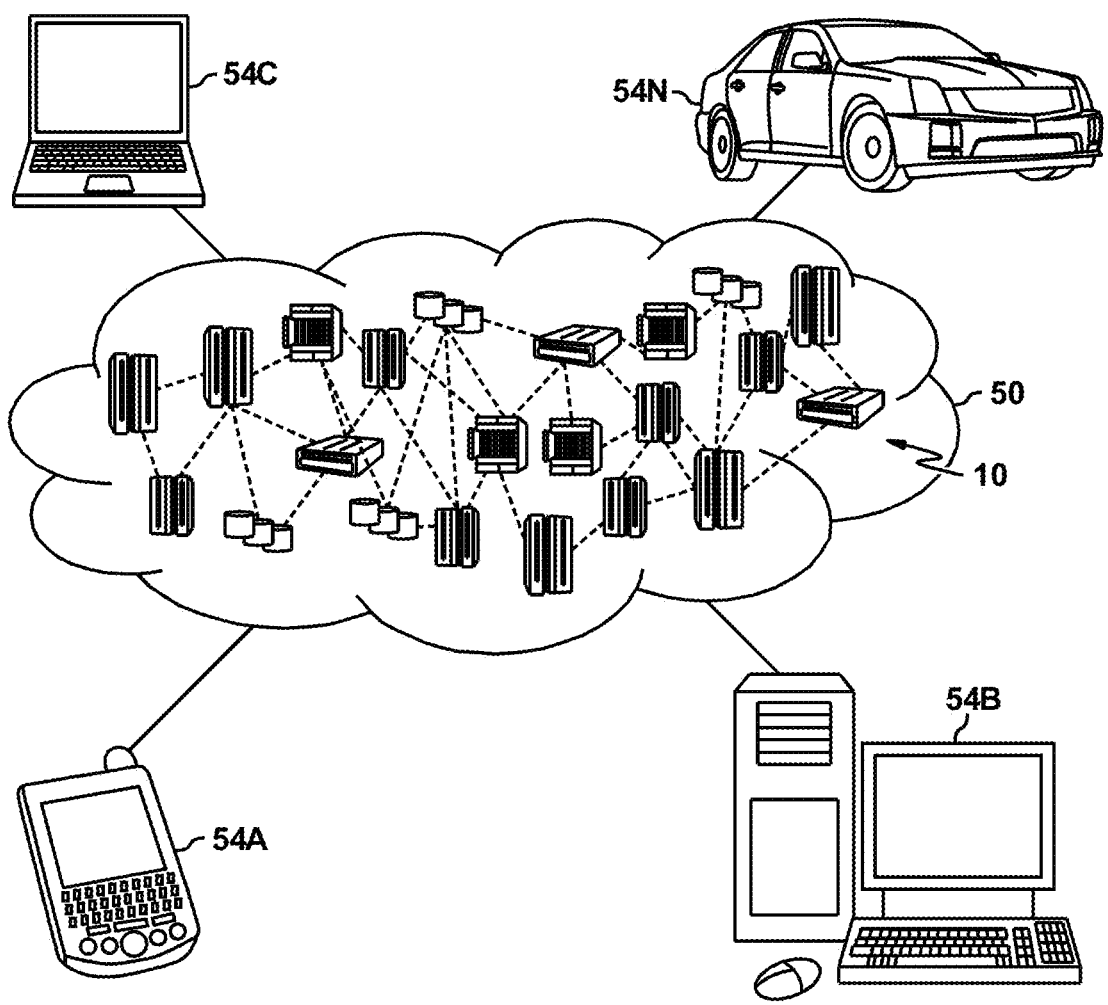
FIG. 14 illustrates a cloud computing environment in which embodiments of the disclosure may be implemented, in accordance with an embodiment of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown in FIG. 14) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

An add-on 700 according to embodiments of the disclosure may be installed in a web browser in the environment of FIG. 14 as follows. One of the cloud computing nodes 10 may host a website from which the add-on 700 may be requested to be downloaded to a third-party computing device such as any of the computing devices 54A, 54B and 54C. The request causes the add-on 700 to be sent from the node 10 via a network connection to the computing device 54A/54B/54C, where the add-on 700 is sent together with an installer for integrating the add-on 700 with a web browser already present on the computing device.

Figure 15:
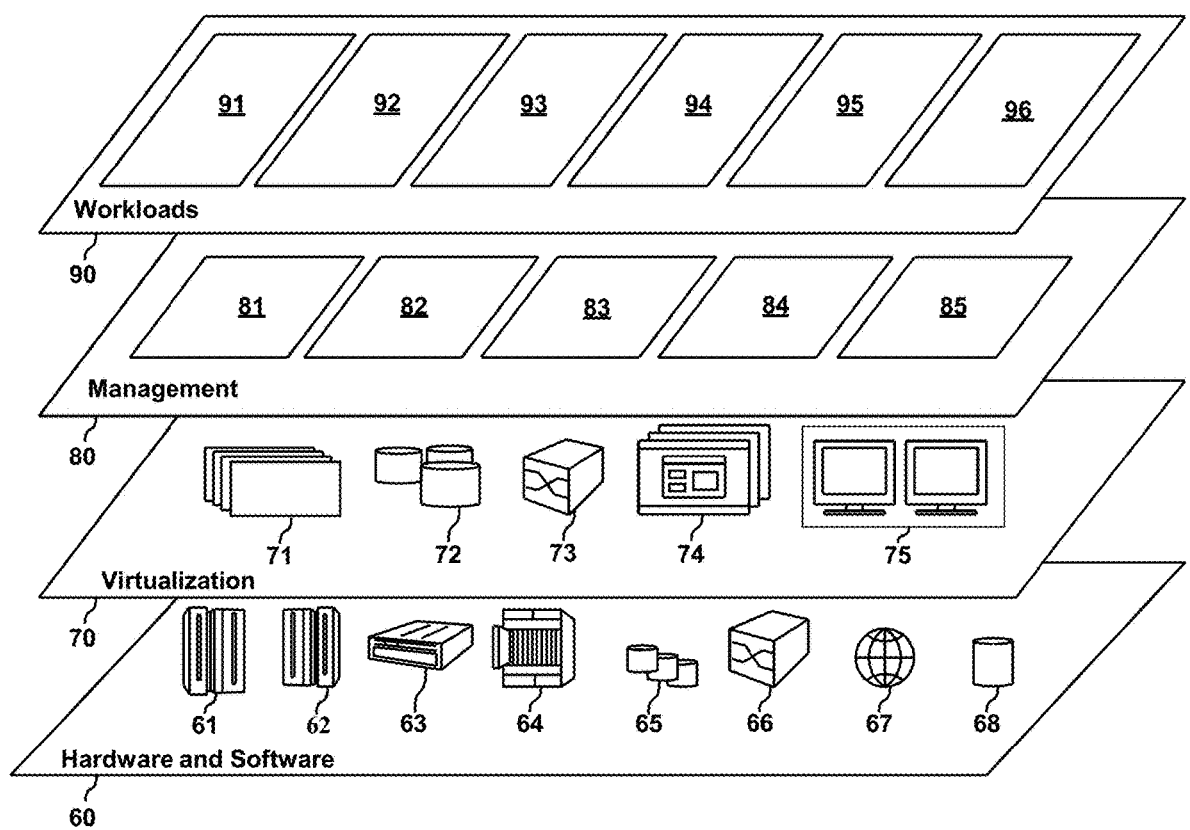
FIG. 15 shows a set of functional abstraction layers provided by the cloud computing environment of FIG. 14, in accordance with an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the disclosure are not limited thereto. As depicted, the following layers and corresponding functions are provided:

Hardware and software layer 60 includes hardware and software components. Examples of hardware components include: mainframe 61; RISC (Reduced Instruction Set Computer) architecture-based server 62; server 63; blade server 64; storage device 65; and network and networking component 66. In some embodiments, software components include network application server software 67 and database software 68.

Virtualization layer 70 provides an abstraction layer from which the following examples of virtual entities may be provided: virtual server 71; virtual storage 72; virtual network 73, including virtual private networks; virtual applications and operating systems 74; and virtual client 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and a web browser process 96 according to embodiments of the disclosure.

It will be clear to one skilled in the art that many improvements and modifications can be made to the foregoing exemplary embodiment without departing from the scope of the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for enhanced navigation in a web browser while avoiding redirects in a non-embedded system comprising:
   presenting, by one or more computer processors, a plurality of web pages in the web browser to a user;
   navigating, by one or more computer processors, one or more web pages of the plurality of webpages by following at least one hyperlink provided in the one or more web pages;
   storing, by one or more computer processors, a browsing history of the user as a chronological list of recently presented webpages;
   determining, by one or more computer processors, whether a dwell time of the user on a first web page of the one or more web pages exceeded a threshold time, wherein the threshold time is dependent on whether the one or web pages is text-rich or mainly photos;
   responsive to determining that the dwell time of the user on the first web page did exceed the threshold time, adding, by one or more computer processors an of-user-interest tag to the first web page stored to the browsing history;
   adding, by one or more computer processors, the of-user-interest tag to the first web page stored to the browsing history further comprising:
      storing a Boolean variable, TRUE, for the first web page of the one or more web pages that exceeds the threshold time; and
      storing a Boolean variable, FALSE, for any web page of the one or more web pages that does not exceed the threshold time;
   presenting the user with an enhanced back button that is not part of original navigation controls of the web browser and an enhanced forward button that is not part of original navigation controls of the web browser, wherein both the enhanced back button and the enhanced forward button are added on the web browser, wherein the enhanced back button allows the user to skip back through the one or more web pages with the of-user-interest tag, that were stored in the browsing history of the user, such as, to the first web page with the of-user-interest tag viewed by the user and the enhanced forward button allows the user to skip forward through the one or more web pages with the of-user-interest tag, that were stored in the browsing history of the user, such as, to a most current web page with the of-user-interest tag viewed by the user;
   automatically deleting, by the one or more computer processors, the one or more web pages with the Boolean variable of FALSE from the browsing history of the user based when the enhanced back button is utilized;
   navigating, by a way of redirect, to a second page of the plurality of webpages without any input from the user; and
   storing into the of-user-interest tag, the Boolean variable of FALSE in succession based on the number of redirect associated with the second page.

2. The method of claim 1, further comprising:
   responsive to determining that the dwell time of the user on the first web page did not exceed the threshold time, presenting, by one or more computer processors, a new web page to the user.

3. The method of claim 1, further comprising:
   receiving, by one or more computer processors, an input from the user, wherein the input from the user is one of an enhanced back command from an enhanced back button and an enhanced forward command from the enhanced forward button, and wherein the enhanced forward command is active when the enhanced back command is utilized;
   responsive to receiving the input from the user, searching, by one or more computer processors, the browsing history of the user for a most recent occurrence of the of-user-interest tag, wherein:
      the browser history is searched backwards when the input is the enhanced back command; and
      the browser history is searched forwards when the input is the enhanced forward command; and
   responsive to locating the most recent occurrence of the of-user-interest tag, presenting, by one or more computer processors, a web page associated with the most recent occurrence of the of-user-interest tag.

4. The method of claim 3, further comprising:
   responsive to not locating the most recent occurrence of the of-user-interest tag, presenting, by one or more computer processors, a most recent web page stored to the browser history of the user.

5. The method of claim 3, further comprising:
   adding, by one or more computer processors, a tab indicator to each web page in the browser history of the user, wherein:
      the tab indicator indicates which tab in a web browser with a plurality of tabs each web page is located; and
      the tab indicator restricts the enhanced back command to web pages in the browser history of the user that include a same tab indicator as a current tab active in the web browser.

6. The method of claim 3, further comprising:
determining, by one or more computer processors, whether a change from a first tab to a second tab in the web browser has occurred; and
responsive to determining that the change from the first tab to the second tab in the web browser has occurred, adding, by one or more computer processors, a tab pointer to the web page in the first tab of the web browser associated with the most recent web page viewed by the user.

7. The method of claim 1, wherein:
the dwell time of the user is based on one of an amount of time the user viewed the first web page and a camera monitoring the user;
the amount of time the user viewed the first web page is determined a time speech input was received by an audio interface; and
the camera monitoring the user determines a tracking of facial movements of the user, a counting of eye blinking of the user, and a tracking of eye motion of the user.

8. The method of claim of claim 1, wherein any web pages from the browsing history that are skipped by the use of the enhanced back button are automatically deleted from the browsing history.

9. A computer program product for enhanced navigation in a web browser while avoiding redirects in a non-embedded system comprising:
one or more computer readable and non-transitory storage media; and
program instructions stored on the one or more computer readable and non-transitory storage media, the program instructions comprising:
program instructions to present a plurality of web pages in the web browser to a user;
program instructions to navigate one or more web pages of the plurality of webpages by following at least one hyperlink provided in the one or more web pages;
program instructions to store a browsing history of the user as a chronological list of recently presented web pages;
program instructions to determine whether a dwell time of the user on a first web page of the one or more web pages exceeded a threshold time, wherein the threshold time is dependent on whether the one or more web pages is text-rich or mainly photos;
responsive to determining that the dwell time of the user on the first web page did exceed the threshold time, program instructions to add an of-user-interest tag to the first web page stored to the browsing history;
program instructions to add the of-user-interest tag to the first web page stored to the browsing history further comprising:
program instructions to store a Boolean variable, TRUE, for the first web page of the one or more web pages that exceeds the threshold time; and
program instructions to store a Boolean variable, FALSE, for any web page of the one or more web pages that does not exceed the threshold time;
program instructions to present the user with an enhanced back button that is not part of original navigation controls of the web browser and an enhanced forward button that is not part of original navigation controls of the web browser, wherein both the enhanced back button and the enhanced forward button are added on the web browser, wherein the enhanced back button allows the user to skip back through the one or more web pages with the of-user-interest tag, that were stored in the browsing history of the user, such as, to the first web page with the of-user-interest tag viewed by the user and the enhanced forward button allows the user to skip forward through the one or more web pages with the of-user-interest tag, that were stored in the browsing history of the user, such as, to a most current web page with the of-user-interest tag viewed by the user;
program instructions to automatically delete the one or more web pages with the Boolean variable of FALSE from the browsing history of the user based when the enhanced back button is utilized;
program instructions to navigate, by a way of redirect, to a second page of the plurality of webpages without any input from the user; and
program instructions to store into the of-user-interest tag, the Boolean variable of FALSE in succession based on the number of redirect associated with the second page.

10. The computer program product of claim 9, further comprising program instructions stored on the one or more computer readable storage media, to:
responsive to determining that the dwell time of the user on the first web page did not exceed the threshold time, present a new web page to the user.

11. The computer program product of claim 9, further comprising program instructions stored on the one or more computer readable storage media, to:
receive an input from the user, wherein the input from the user is one of an enhanced back command from an enhanced back button and an enhanced forward command from the enhanced forward button, and wherein the enhanced forward command is active when the enhanced back command is utilized;
responsive to receiving the input from the user, search the browsing history of the user for a most recent occurrence of the of-user-interest tag, wherein:
the browser history is searched backwards when the input is the enhanced back command; and
the browser history is searched forwards when the input is the enhanced forward command; and
responsive to locating the most recent occurrence of the of-user-interest tag, present a web page associated with the most recent occurrence of the of-user-interest tag.

12. The computer program product of claim 11, further comprising program instructions stored on the one or more computer readable storage media, to:
responsive to not locating the most recent occurrence of the of-user-interest tag, present a most recent web page stored to the browser history of the user.

13. The computer program product of claim 11, further comprising program instructions stored on the one or more computer readable storage media, to:
add a tab indicator to each web page in the browser history of the user, wherein:
the tab indicator indicates which tab in a web browser with a plurality of tabs each web page is located; and
the tab indicator restricts the enhanced back command to web pages in the browser history of the user that include a same tab indicator as a current tab active in the web browser.

14. The computer program product of claim 11, further comprising program instructions stored on the one or more computer readable storage media, to:

determine whether a change from a first tab to a second tab in the web browser has occurred; and responsive to determining that the change from the first tab to the second tab in the web browser has occurred, add a tab pointer to the web page in the first tab of the web browser associated with the most recent web page viewed by the user.

15. The computer program product of claim 9, wherein:

the dwell time of the user is based on one of an amount of time the user viewed the first web page and a camera monitoring the user;

the amount of time the user viewed the first web page is determined by at least one of a time touch input was received on a touchscreen, a time speech input was received by an audio interface, a time cursor input was detected in a user interface, and a time page scrolling was detected in the user interface; and the camera monitoring the user determines a tracking of facial movements of the user, a counting of eye blinking of the user, and a tracking of eye motion of the user.

16. The computer program product of claim 9, wherein any web pages from the browsing history that are skipped by the use of the enhanced back button are automatically deleted from the browsing history.

17. A computer system product for enhanced navigation in a web browser while avoiding redirects in a non-embedded system comprising:

one or more computer processors;

one or more computer readable storage media; and program instructions stored on the one or more computer readable storage media for execution by at least one of the one or more computer processors, the program instructions comprising:

program instructions to present a plurality of web pages in the web browser to a user;

program instructions to navigate one or more web pages of the plurality of webpages by following at least one hyperlink provided in the one or more web pages;

program instructions to store a browsing history of the user as a chronological list of recently presented web pages;

program instructions to determine whether a dwell time of the user on a first web page of the one or more web pages exceeded a threshold time, wherein the threshold time is dependent on whether the one or web pages is text-rich or mainly photos;

responsive to determining that the dwell time of the user on the first web page did exceed the threshold time, program instructions to add an of-user-interest tag to the first web page stored to the browsing history;

program instructions to add the of-user-interest tag to the first web page stored to the browsing history further comprising:

program instructions to store a Boolean variable, TRUE, for the first web page of the one or more web pages that exceeds the threshold time; and program instructions to store a Boolean variable, FALSE, for any web page of the one or more web pages that does not exceed the threshold time;

program instructions to present the user with an enhanced back button that is not part of original navigation controls of the web browser and an enhanced forward button that is not part of original navigation controls of the web browser, wherein both the enhanced back button and the enhanced forward button are added on the web browser, wherein the enhanced back button allows the user to skip back through the one or more web pages with the of-user-interest tag, that were stored in the browsing history of the user, such as, to the first web page with the of-user-interest tag viewed by the user and the enhanced forward button allows the user to skip forward through the one or more web pages with the of-user-interest tag, that were stored in the browsing history of the user, such as, to a most current web page with the of-user-interest tag viewed by the user;

program instructions to automatically delete the one or more web pages with the Boolean variable of FALSE from the browsing history of the user based when the enhanced back button is utilized;

program instructions to navigate, by a way of redirect, to a second page of the plurality of webpages without any input from the user; and program instructions to store into the of-user-interest tag, the Boolean variable of FALSE in succession based on the number of redirect associated with the second page.

18. The computer system of claim 17, further comprising program instructions stored on the one or more computer readable storage media for execution by at least one of the one or more computer processors, to:

responsive to determining that the dwell time of the user on the first web page did not exceed the threshold time, present a new web page to the user.

19. The computer system of claim 17, further comprising program instructions stored on the one or more computer readable storage media for execution by at least one of the one or more computer processors, to:

receive an input from the user, wherein the input from the user is one of an enhanced back command from an enhanced back button and an enhanced forward command from the enhanced forward button, and wherein the enhanced forward command is active when the enhanced back command is utilized;

responsive to receiving the input from the user, search the browsing history of the user for a most recent occurrence of the of-user-interest tag, wherein:

the browser history is searched backwards when the input is the enhanced back command; and the browser history is searched forwards when the input is the enhanced forward command; and responsive to locating the most recent occurrence of the of-user-interest tag, present a web page associated with the most recent occurrence of the of-user-interest tag.

20. The computer system of claim 19, further comprising program instructions stored on the one or more computer readable storage media for execution by at least one of the one or more computer processors, to:

responsive to not locating the most recent occurrence of the of-user-interest tag, present a most recent web page stored to the browser history of the user.

* * * * *